(12) United States Patent
Hagiwara (10) Patent No.: US 7,311,269 B2
(45) Date of Patent: Dec. 25, 2007

(54) VEHICLE LAMP CLEANING APPARATUS

(75) Inventor: Masato Hagiwara, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 284 days.

(21) Appl. No.: 11/181,595

(22) Filed: Jul. 14, 2005

(65) Prior Publication Data

US 2006/0038038 A1 Feb. 23, 2006

(30) Foreign Application Priority Data

Aug. 19, 2004 (JP) ............... P.2004-239662

(51) Int. Cl.
  *B05B 1/10* (2006.01)
  *B05B 1/00* (2006.01)
  *B60S 1/46* (2006.01)

(52) U.S. Cl. .................. 239/284.2; 239/284.1; 239/600

(58) Field of Classification Search ......... 239/284.1, 239/284.2, 600
See application file for complete search history.

(56) References Cited

U.S. PATENT DOCUMENTS

| | | | | |
|---|---|---|---|---|
| 4,955,543 A | * | 9/1990 | Orth et al. ........... | 239/284.2 |
| 5,163,619 A | * | 11/1992 | Wada ............... | 239/284.1 |
| 6,199,773 B1 | | 3/2001 | Holt et al. | |
| 6,305,618 B1 | * | 10/2001 | Lin ................ | 239/284.1 |
| 6,761,323 B2 | * | 7/2004 | Hsieh .............. | 239/284.1 |
| 6,789,747 B2 | * | 9/2004 | Kuch et al. ......... | 239/284.1 |

FOREIGN PATENT DOCUMENTS

| | | |
|---|---|---|
| DE | 43 24 259 | 1/1995 |
| DE | 197 48 781 A1 | 5/1998 |
| DE | 198 11 827 A1 | 10/1998 |
| EP | 1 099 610 A1 | 5/2001 |
| FR | 2 705 075 | 11/1994 |
| FR | 2 752 755 | 3/1998 |
| JP | 63-065966 | 3/1988 |

* cited by examiner

*Primary Examiner*—Davis Hwu
(74) *Attorney, Agent, or Firm*—Fish & Richardson P.C.

(57) ABSTRACT

A vehicle lamp cleaning apparatus includes a nozzle having a cleaning fluid injection port at one end and an opened end at the other end thereof, a nozzle holder having a flow path which communicates with the cleaning fluid injection port and a first joint portion which fits on the other end portion of the nozzle, and a cleaning fluid supply portion, wherein a first and second annular portions are formed on circumferential surface of the nozzle and the first joint portion, respectively, when the other end portion of the nozzle fits on the first joint portion of the nozzle holder, the first and second annular portions fit each other in concavo-convex fitting manner to thereby form a first fit portion, and the nozzle is held by the first fit portion rotatably relative to the nozzle holder around a fitting direction.

11 Claims, 6 Drawing Sheets

VEHICLE LAMP CLEANING APPARATUS

BACKGROUND OF THE INVENTION

1. Field of the Invention

The present invention relates to a novel vehicle lamp cleaning apparatus and more particularly to a technique for enabling the reduction in size of the apparatus, in particular, the size in a height direction thereof and the adjustment of cleaning fluid injecting direction.

2. Description of the Background Art

As a cleaning apparatus for cleaning a cover lens of an automotive headlamp, there exists one described in Japanese Patent Unexamined Publication JP-A-63-65966.

With the cleaning apparatus described in the above document, the miniaturization of the apparatus is difficult.

Namely, since a nozzle holder, which holds a nozzle, has only a function to hold a nozzle. A construction is of a seal between a cleaning fluid supply portion for supplying cleaning fluid to the nozzle and a nozzle is such that a tube for supplying cleaning fluid is fitted on a distal end of an extended portion (cleaning fluid flowing path) in which a part of the nozzle is extended, so that a seal is effected at a connecting portion between the tube and the extended portion of the nozzle. Accordingly, it is difficult to make the apparatus smaller in size in a height direction of the nozzle.

In addition, since the nozzle holder is formed to hold the nozzle in such a manner as to enclose from an outside thereof, the outside diameter of the nozzle holder has to be increased.

Then, a problem that is to be solved by the invention is how to enable the reduction in size of a vehicle lamp cleaning apparatus, in particular, the size in a height direction thereof and the adjustment of cleaning fluid injecting direction.

SUMMARY OF THE INVENTION

With a view to solving the problem, according to a first aspect of the present invention, there is provided a vehicle lamp cleaning apparatus, comprising:

a cylindrical nozzle having:
  a cleaning fluid injection port at one end; and
  an opened end at the other end thereof;
a nozzle holder having:
  a flow path which communicates with the cleaning fluid injection port of the nozzle; and
  a first cylindrical joint portion which fits on the other end portion of the nozzle; and
a cleaning fluid supply portion to which the nozzle holder is connected, wherein a first and second annular portions are formed on an inner circumferential surface of the other end portion of the nozzle and an outer circumferential surface of the first joint portion of the nozzle holder, respectively, so as to extend around the full circumference thereof, when the other end portion of the nozzle fits on the first joint portion of the nozzle holder, the first and second annular portions fit on and in each other in concavo-convex fitting manner to thereby form a first fit portion, and the nozzle is held by the first fit portion rotatably relative to the nozzle holder only around a first axis which extends in a fitting direction.

According to a second aspect of the present invention as set forth in the first aspect of the present invention, it is preferable that the nozzle holder further has a second cylindrical joint portion of the nozzle holder situated opposite to the first joint portion across the flow path, the cleaning fluid supply portion has a cylindrical connecting portion, a third and fourth annular portions are formed on the second cylindrical joint portion and the cylindrical connecting portion, respectively, so as to extend around the full circumference thereof, when the second joint portion fit on and in each other, the third and fourth annular portions fit on and in each other in concavo-convex fitting manner to thereby form a second fit portion, and the nozzle holder is held by the second fit portion rotatably relative to the cleaning fluid supply portion only around a second axis which intersects with the first axis.

According to a third aspect of the present invention as set forth in the first aspect of the present invention, it is preferable that convex portions of the annular portions which fit on and in each other each have:

an inclined surface which is inclined relative to the fitting direction; and
a locking surface which has a perpendicular or larger angle relative to a fitting-releasing direction, concave portions thereof each have an inclined surface and a locking surface which correspond to the inclined surface and the locking surface of the convex portions, respectively, and the convex and concave portions fit in and on each other at least at the inclined surfaces thereof in a face-to-face contact fashion.

According to a fourth aspect of the present invention as set forth in the first aspect of the present invention, it is preferable that the nozzle holder has a straightening collar portion.

According to a fifth aspect of the present invention as set forth in the first aspect of the present invention, it is preferable that the nozzle is made of synthetic resin having elasticity.

According to a sixth aspect of the present invention as set forth in the first aspect of the present invention, it is preferable that the nozzle holder holds plurality of the nozzle.

According to a seventh aspect of the present invention as set forth in the first aspect of the present invention, it is preferable that the nozzle has a rib at a position which is closer to the upper end of thereof and opposite to the cleaning fluid injection port.

According to an eighth aspect of the present invention as set forth in the first aspect of the present invention, it is preferable that a number of projections, which are outwardly protrude and vertically extend, are formed on an outer circumferential surface of the nozzle.

According to a ninth aspect of the present invention as set forth in the first aspect of the present invention, it is preferable that the cleaning fluid injection port opens upwardly relative to a plane which is perpendicular to the first axis.

According to a tenth aspect of the present invention as set forth in the first aspect of the present invention, the fitting direction is defined by line connecting two members to be fitted.

According to an eleventh aspect of the present invention as set forth in the third aspect of the present invention, the fitting-releasing direction is defined by plane which is perpendicular to the line connecting the two members to be fitted.

Consequently, according to the present invention, dimensions in the height and outside diameter directions can be reduced, and the injecting direction of cleaning fluid can be adjusted.

According to the vehicle lamp cleaning apparatus as set forth in the first aspect of the present invention, since the connection to the cleaning fluid flow path and the holding of the nozzle relative to the nozzle holder are achieved at the same location, the size in the height direction can be reduced. Furthermore, since the joint portion of the nozzle holder is fitted in the other end portion of the nozzle, the outside diameter at the location where the nozzle is held can be made as same as the outside diameter of the nozzle. Thus, from these features, the reduction in size at the nozzle holding portion can be attained. Furthermore, since the portion where the holding of the nozzle relative to the nozzle holder is implemented also functions as the location where the adjustment of nozzle direction can be implemented, the adjustment of injecting direction of cleaning fluid can be implemented with the small and simple construction.

According to the second aspect of the present invention, the direction of the cleaning fluid injection port of the nozzle can be adjusted around the two axes which intersect with each other, thereby making it possible to implement the adjustment of injecting direction of cleaning fluid over a wide range.

According to the third aspect of the present invention, the sealing property at the joint portion between the nozzle and the nozzle holder is improved, and since the locking surface has the perpendicular or larger angle relative to the direction in which the fit so made is released, the dislodgement of the nozzle from the nozzle holder is made difficult.

According to the fourth aspect of the present invention, there is no need to use a separate component for straightening the flow of cleaning fluid, and hence the number of components can be reduced, thereby making it possible to attain the configuration at low costs.

DETAILED DESCRIPTION OF THE PREFERRED EMBODIMENTS

Hereinafter, a best mode for carrying out a vehicle lamp cleaning apparatus according to the present invention will be described by reference to the accompanying drawings. Note that an embodiment illustrated in the drawings is such that the present invention is applied to a cleaning apparatus for cleaning a front cover of an automotive headlamp.

Figure 1:
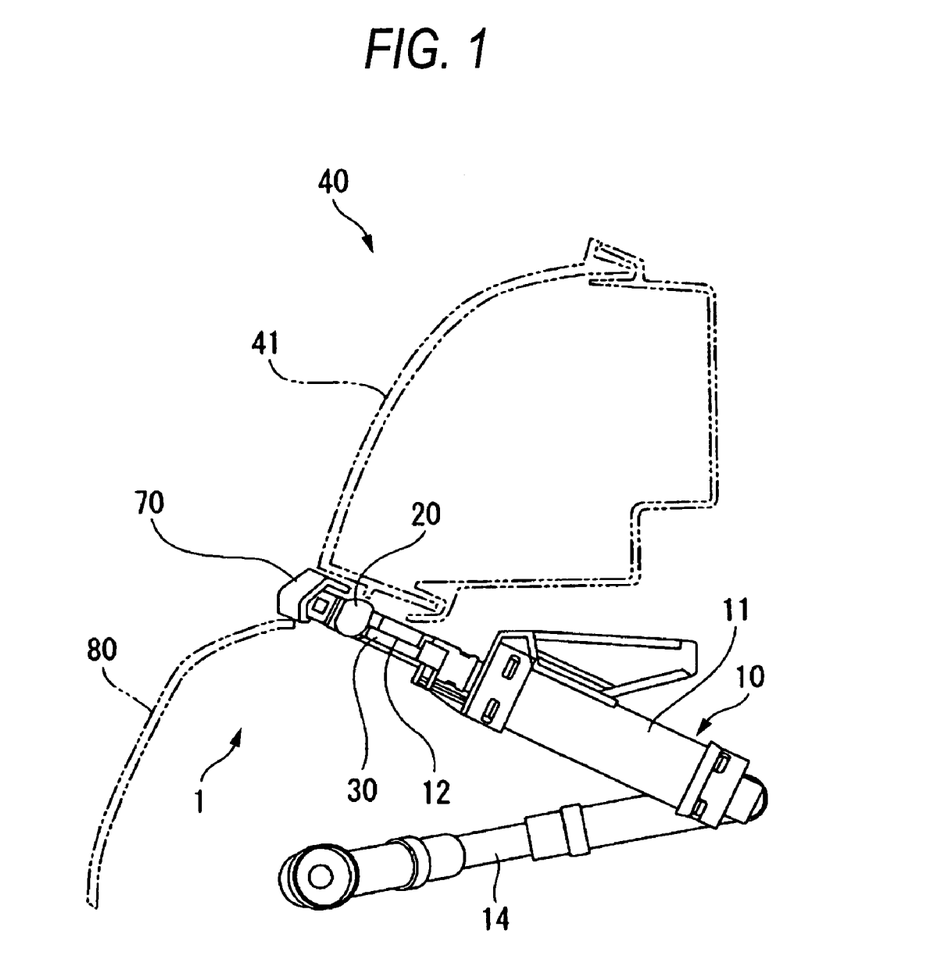
FIG. 1 is a side view showing, together with FIG. 2, the entirety of a vehicle lamp cleaning apparatus according to an embodiment of the present invention, which is shown as being in a not-in-use state.

As shown in FIG. 1 and , a cleaning apparatus 1 includes a cleaning fluid supply portion 10, a nozzle 20 and a nozzle holder 30.

The cleaning fluid supply portion 10 is configured not only to supply cleaning fluid to the nozzle 20 via the nozzle holder 30 but also to shift a position of the nozzle 20 in accordance with in use (that is, in an operation for cleaning) or not in use of the cleaning apparatus 1. Also, the cleaning fluid supply portion 10 includes a cylinder 11 and a piston 12. The cylinder 11 is fixed to a headlamp 40 on a lower side of the headlamp, and the piston 12 is supported slidably relative to the cylinder 11. Then, the nozzle holder 30 is supported on a distal end of the piston 12, and the nozzle 20 is held on the nozzle holder 30.

As shown in FIG. 1, when not in use of the cleaning apparatus 1, the cylinder 12 is put in a state in which most of the piston 12 is withdrawn into the interior of the cylinder 11 by means of a spring, not shown, which is provided within the cylinder 11.

Figure 2:
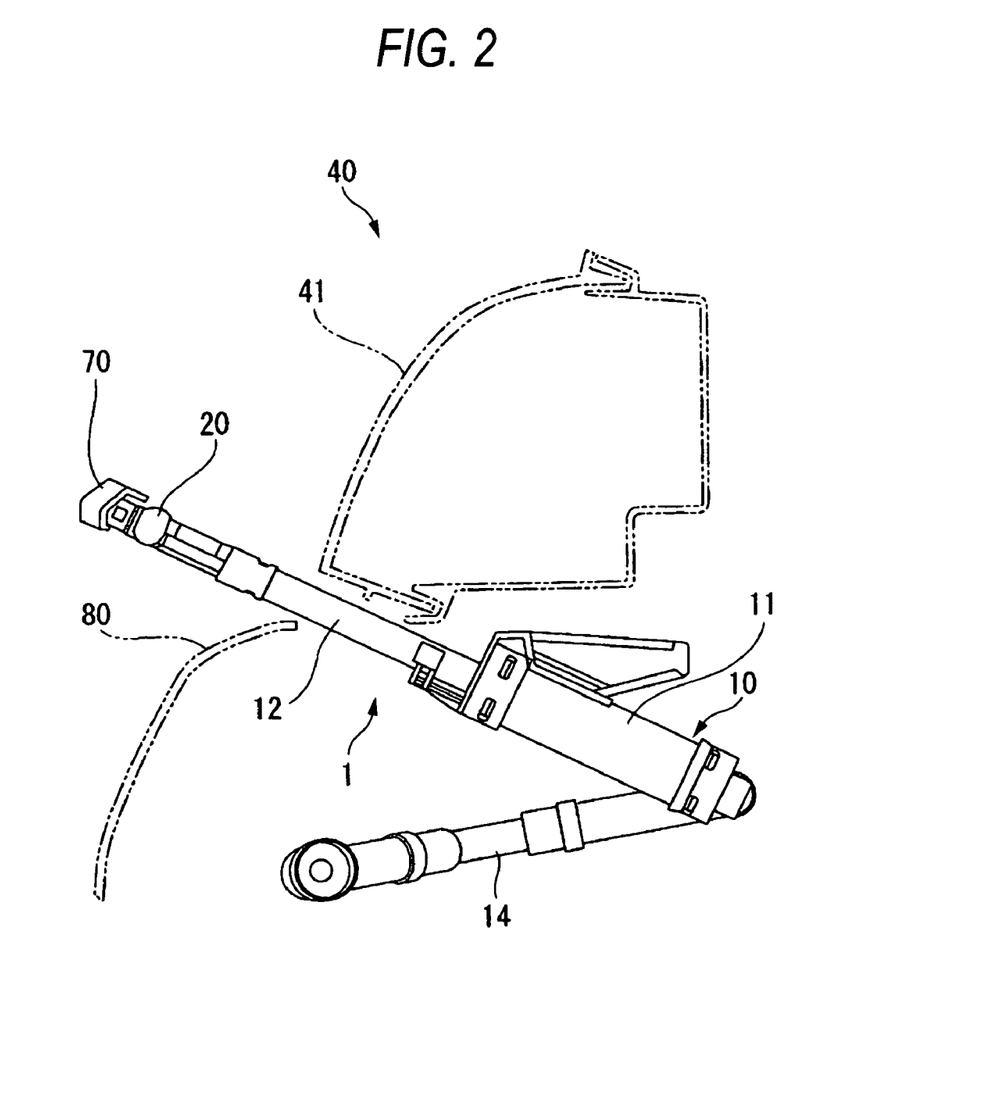
FIG. 2 is a side view, similar to FIG. 1, which shows the cleaning apparatus in a in-use state.

As shown in FIG. 2, when in use or in operation for cleaning a front cover 41 of the headlamp 40, cleaning fluid is sent under pressure into the cylinder 11 via a cleaning fluid supply pipe 14 by means of a pump, not shown, or the like. Then, the piston 12 protrudes from the cylinder to a position shown in FIG. 2 against the pulling force of the spring. The nozzle 20 is put in such a state as to face the front cover 41 of the headlamp 40, in which state cleaning fluid is injected from the nozzle 20 toward the front cover 41 of the headlamp 40. Then, when the supply of cleaning fluid to the cylinder 11 is stopped upon the completion of the cleaning of the front cover 41 of the headlamp 40, the pressure of cleaning fluid within the cylinder 11 is reduced, and the piston 12 is withdrawn back into the interior of the cylinder 11 by virtue of the pulling force of the spring in the cylinder 11 until a position shown in FIG. 1 is reached.

Figure 3:
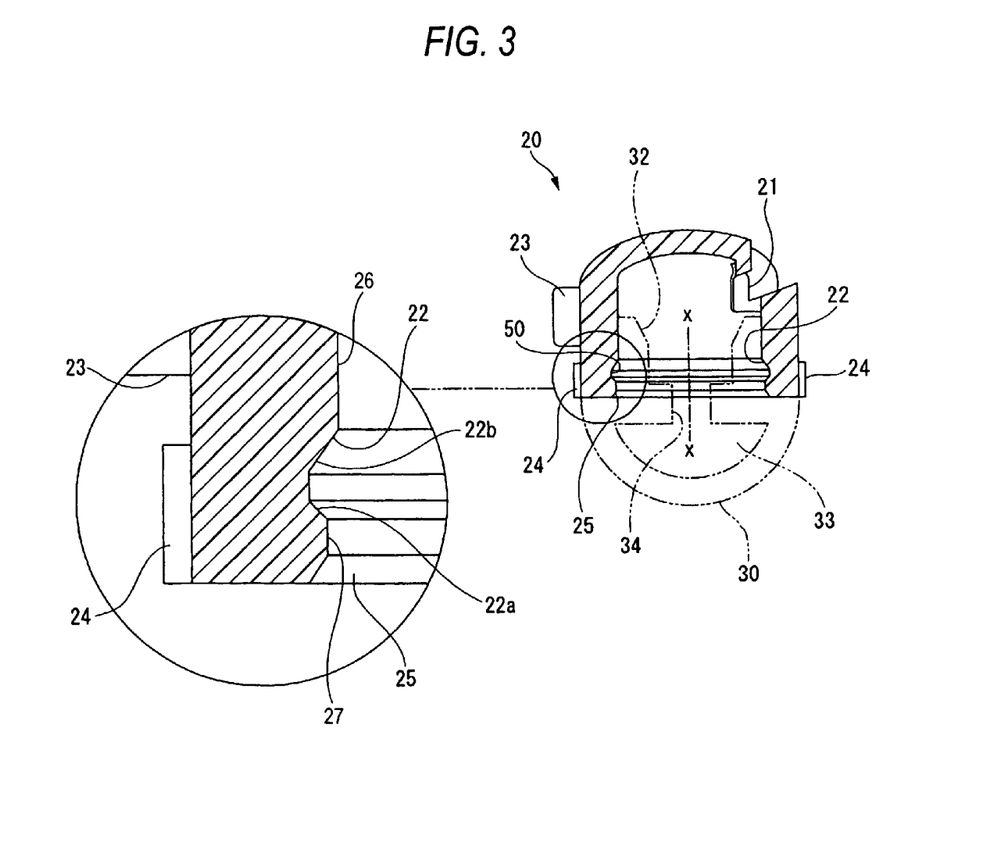
FIG. 3 is a vertical cross-sectional view which shows a nozzle together with FIG. 4.
Figure 4:
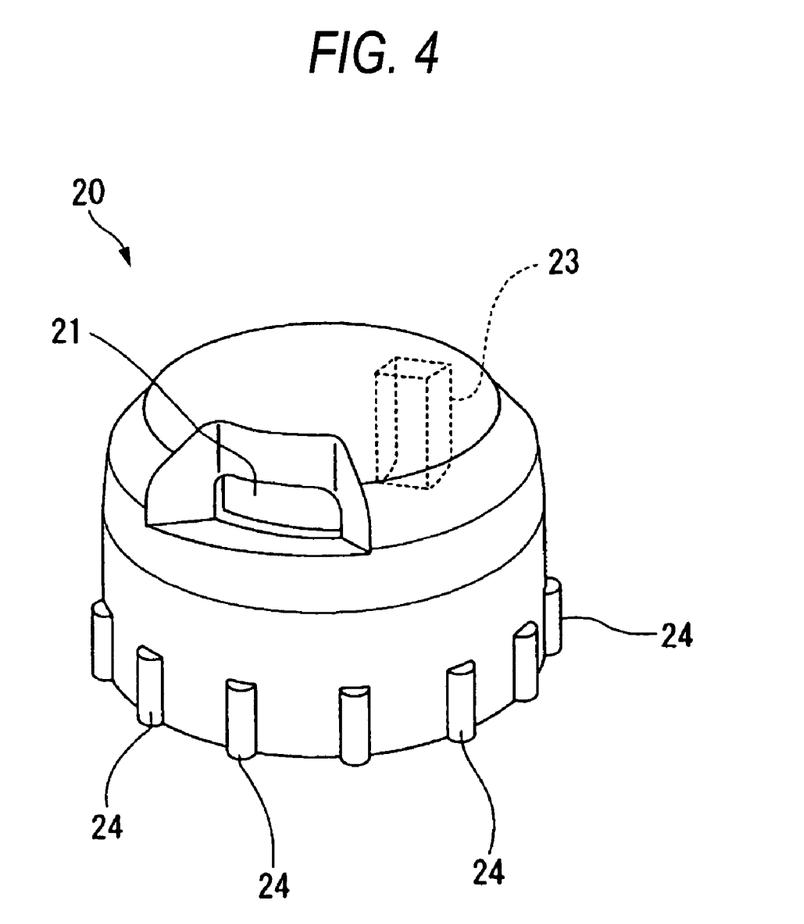
FIG. 4 is a schematic perspective view.

Details of the nozzle 20 are shown in FIGS. 3 and 4. The nozzle 20 is formed substantially into a cylindrical shape, and the nozzle 20 is closed at an upper end and is opened at a lower end thereof. Then, a cleaning fluid injection port 21 is opened in a side part of an upper end portion of the nozzle 20. As is seen in FIG. 3, the cleaning fluid injection port 21 is inclined slightly upward toward the outside, whereby cleaning fluid is made to be injected slightly upward.

A first annular portion 22 is formed on an inner circumferential surface of the nozzle 20 at a portion which is positioned slightly upward from a lower end opening in the nozzle 20 in such a manner as to extend around the full circumference of the circumferential inner surface. The first annular portion 21 is formed as a concave groove. A portion 22b of the concave groove 22 which excludes a lower end portion 22a thereof is made into an inclined surface which is moderately inclined so as to shift its position closer toward the inner circumferential surface of the nozzle 20 as it extends upward. While the lower end portion 22a of the concave groove 22 is also inclined so as to shift its position closer toward the inner circumferential surface of the nozzle 20 as it extends downward. The inclination of the lower end portion 22a is steeper than that of the inclined surface 22b, and the inclined surface 22a is made to constitute a locking surface.

Furthermore, a diametrically expanded portion 25 is formed on the inner circumferential surface of the nozzle 20 at a lower end portion thereof in such a manner as to expand radially outward in a gradual fashion as the diametrically expanded portion 25 expands toward a lower end of the nozzle 20.

In addition, a diameter of an inner wall 26 which is positioned upper side of the inclined surface 22b is slightly smaller than a diameter of an inner wall 27 which is positioned lower side of the inclination of the lower end portion 22a. According to this structure, the nozzle 20 can more easily fit to the nozzle holder 30.

A relatively large rib 23 is formed on an outer circumferential surface of the nozzle 20 at a position which is closer to the upper end of the nozzle 20 is opposite to the portion thereof where the cleaning fluid injection port 21 is opened and is made to function as a mark, as well as a portion catching hold of the fingers when adjusting the direction of the nozzle. In addition, a number of vertically extending small elongated projections 24, 24 are formed circumferentially at constant intervals around the outer circumferential surface of the nozzle 20 at the lower end portion thereof. The small elongated projections 24, 24 are made to function as slip preventive means when the nozzle 20 is rotated relative to the nozzle holder 30, as well as marks when the direction of the nozzle 20 is determined.

A nozzle 20 like one that has been described above is preferably formed of a synthetic resin such as POM (polyoxymethylene) which is slightly elastic, whereby the nozzle 20 can be removed from a mold by virtue of a so-called forcible removal which utilizes the elasticity of the nozzle 20 without using a sliding mold, thereby making it possible to keep the production costs as low as possible. Note that it goes without saying that the material of the nozzle 20 is not limited to POM.

Figure 5:
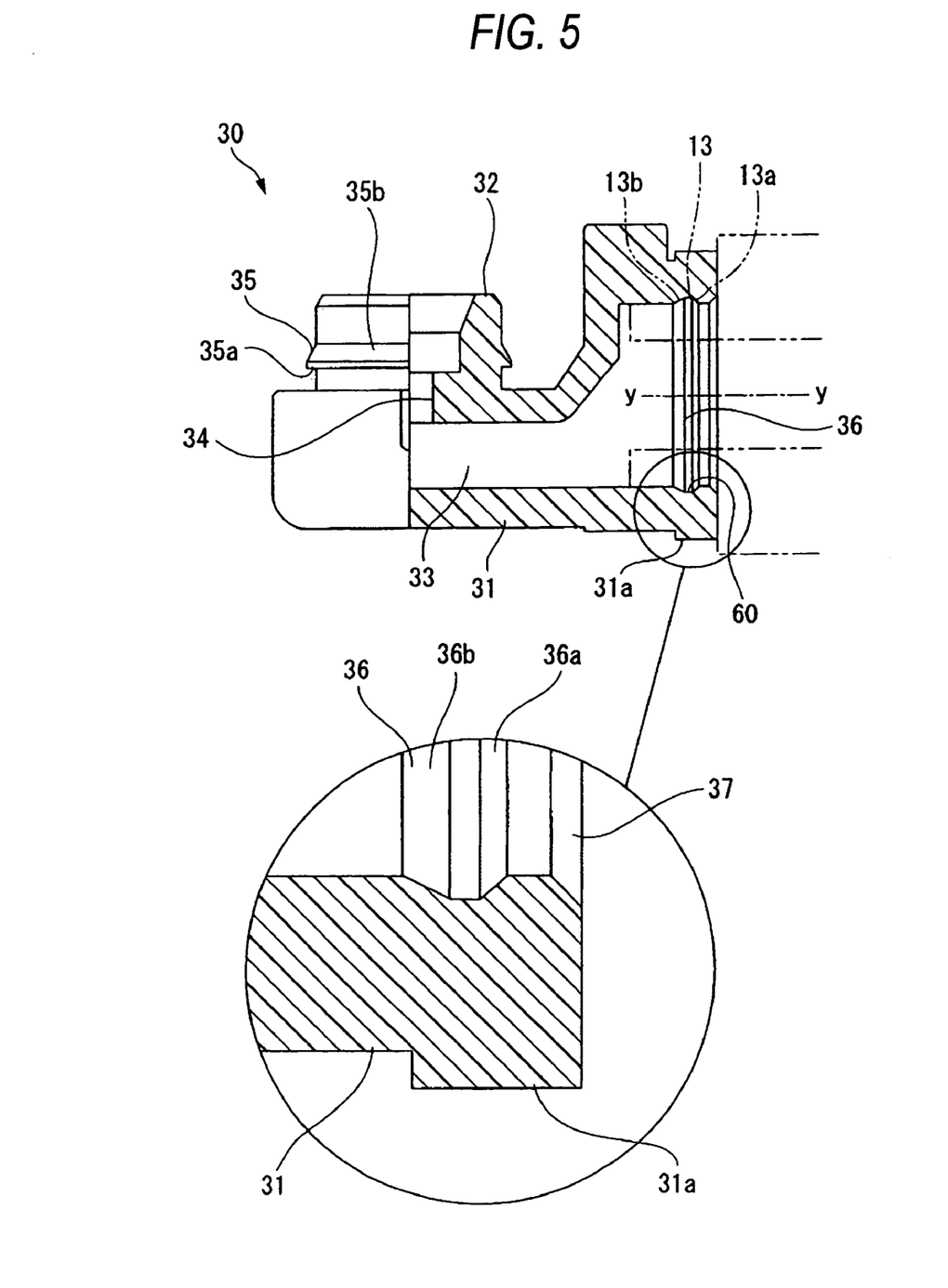
FIG. 5 is a partially cut-away view showing a nozzle holder.

As shown in FIG. 5, the nozzle holder 30 is made up of a flow path forming portion 31 and a first joint portion 32, which are integrated with each other. The flow path forming portion 31 includes a flow path 33 which is closed at a front end and is opened at a rear end thereof. A rear end portion of the flow path forming portion 31 is made to constitute a second joint portion which is cylindrical. The first joint portion 32 is formed into a cylinder which protrudes upward from a front end portion of the flow path forming portion 31. The interior of the first joint portion 32 and the flow path 33 are made to communicate with each other by a communication hole 34 with a diameter which is much smaller than inside diameters of the first joint portion 32 and the flow path 33. A wall portion, which separates the interior of the first joint portion 32 from the flow path 33 and in which the communication hole 34 is formed, functions as a straightening collar, whereby cleaning fluid is straightened when it passes through the communication hole 34.

An outside diameter of the first joint portion 32 is substantially equal to an inside diameter of the nozzle 20. In particular, the outside diameter of the A second annular portion 35 is formed on an outer circumferential surface of the first joint portion 32 in such a manner as to extend around the full circumference thereof. The second annular portion 35 is formed into an elongated projection. A portion 35b of the elongated projection 35 which excludes a lower end portion 35a thereof is formed into an inclined surface which is inclined in such a manner as to approach the outer circumferential surface of the first joint portion 32 as it extends upward. The lower end portion 35a is made to constitute a locking surface which is substantially perpendicular to the outer circumferential surface of the first joint portion 32. Then, the inclination and vertical width of the inclined surface 35b are formed substantially equal to the inclination and vertical width of the inclined surface 22b of the first annular portion.

A third annular portion 36 is formed on an inner circumferential surface of the second joint portion 31a of the flow path forming portion 31 in such a manner as to extend around the full circumference thereof. The third annular portion 36 is formed as a concave groove. A portion 36b of the concave groove 36 which excludes a rear end portion 36a thereof is made into an inclined surface which is moderately inclined so as to shift its position closer toward the inner circumferential surface of flow path forming portion 31 as it extends forward. While the rear end portion 36a of the concave groove 36 is also inclined so as to shift its position closer toward the inner circumferential surface of the flow path forming portion 31 as it extends rearward, the inclination of the rear end portion 36a is steeper than that of the inclined surface 36b, and the inclined surface 36a is made to constitute a locking surface.

Furthermore, a diametrically expanded portion 37 is formed on the inner circumferential surface of the flow path forming portion 31 at a rear end portion thereof in such a manner as to expand radially outward in a gradual fashion as the diametrically expanded portion 37 expands toward a rear end of the flow path forming portion 31.

A nozzle holder 30 like one that has been described above is preferably formed of a synthetic resin such as POM (polyoxymethylene) which is slightly elastic, whereby the nozzle holder 30 can be removed from a mold by virtue of a so-called forcible removal which utilizes the elasticity of the nozzle holder 30 without using a sliding mold, thereby making it possible to keep the production costs as low as possible. Note that it goes without saying that the material of the nozzle holder 30 is not limited to POM.

A distal end portion of the piston 12 is formed into a connecting portion 12a with a cylindrical shape. An outside diameter of the connecting portion 12a is substantially equal to an inside diameter of the second joint potion 31a that is formed at the rear end portion of the flow path forming portion 31 of the nozzle holder 30. A fourth annular portion 13 is formed on an outer circumferential surface of the connecting portion 12a of the piston 12 in such a manner as to extend around the full circumference thereof. The fourth annular portion 13 is formed as an elongated projection, and a portion 13b of the elongated projection 13 which excludes a rear end portion 13a thereof is formed into an inclined surface which is inclined in such a manner as to approach the outer circumferential surface of the piston as it extends forward. The rear end portion 13a is made to constitute a locking surface which is substantially perpendicular to the outer circumferential surface of the piston 12. Then, the inclination and longitudinal width of the inclined surface 13b are formed substantially the same as the inclination and longitudinal width of the inclined surface 36b of the third annular portion 36.

The nozzle 20 is supported on the nozzle holder 30 in a manner that will be described below.

The nozzle 20 is fitted on the first joint portion 32 of the nozzle holder 30 from thereabove. Then, firstly, the diametrically expanded portion 25 of the nozzle 20 rides over the second annular portion 35, and following this, the first annular portion 22 of the nozzle 20 fits on the second annular portion 35 of the nozzle holder 30 via concave and convex fitting, whereby a first fit portion 50 is formed thereat. At the first fit portion 50, the inclined surfaces 22b and 35b of the respective annular portions 22 and 35 are put in such a state that the inclined surfaces are in close contact with each other, whereby the sealing property between the nozzle 20 and the first joint portion 32 of the nozzle holder 30 is maintained in a good condition, and the easy dislodgement of the nozzle 20 from the first joint portion 32 of the nozzle holder 30 is prevented through the engagement between the locking surfaces 22a and 35a. In addition, since the respective annular portions 22, 35 extend around the full circumferences of the inner circumferential surface of the nozzle 20 and the outer circumferential surface of the nozzle holder 30, respectively, the nozzle 20 is made rotatable relative to the first joint portion 32 of the nozzle holder 30 around a first axis x which extends in a fitting direction in which the nozzle holder 20 fits on the first joint portion 32 of the nozzle holder. Consequently, the direction of the cleaning fluid injection port 21 of the nozzle 20 or the injecting direction of cleaning fluid can be adjusted by rotating the nozzle 20 around the first axis x. Note that when the nozzle 20 is rotated relative to the first joint portion 32 of the nozzle holder 30, the rib 23 and the small elongated projections 24, 24 prevent the slippage of the fingers and also constitute marks which help determine the direction of the nozzle 20.

The nozzle holder 30 is supported on the piston 12 in a manner that will be described below.

The second joint portion 31a of the nozzle holder 30 is fitted on the connecting portion 12a of the piston 12 from the front thereof. Then, firstly, the diametrically expanded portion 37 of the nozzle holder 30 rides over the fourth annular portion 13. Then, the third annular portion 36 of the nozzle holder 30 fits on the fourth annular portion 13 of the piston 12 via concave and convex fitting to thereby form a second fit portion 60 thereat. At the second fit portion 60, the inclined surfaces 36b and 13b of the respective annular portions 36 and 13 are put in such a state that the inclined surfaces are in close contact with each other. Therefore, the sealing property is maintained in a good condition between the nozzle holder 30 and the distal end portion of the piston 12, and the easy dislodgement of the nozzle holder 30 from the distal end portion of the piston 12 is prevented through the engagement between the locking surfaces 36a and 13a. In addition, since the respective annular portions 36, 13 extend around the full circumferences of the inner circumferential surface of the nozzle holder 30 and the outer circumferential surface of the connecting portion 12a of the piston 20, respectively, the nozzle holder 30 is made rotatable relative to the connecting portion 12a of the piston around a second axis y which extends in a fitting direction in which the nozzle holder 30 fits on the connecting portion 12a of the piston 12. Consequently, the cleaning fluid injection port 21 of the nozzle 20 which is supported on the nozzle holder 30 can be adjusted by rotating the nozzle holder 30 around the second axis y. Then, since the nozzle 20 becomes rotatable relative to the nozzle holder 30 around the first axis x and the nozzle holder 30 becomes rotatable relative to the piston 12 around the second axis y, the direction of the cleaning fluid injection port 21, that is, the injecting direction of cleaning fluid can be adjusted over a wide range.

Note that reference numeral 70 shown in FIG. 1 denotes a nozzle cover adapted to be attached to a distal end portion of the nozzle holder 30 and is positioned in such a manner as to cover a front end of the nozzle 20. The nozzle cover 70 is such as to cover an area between the headlamp 40 and a vehicle body 80 (part thereof, for example, a bumper) when not in use, so that the nozzle 20 becomes invisible from the front.

In the embodiment that has been described heretofore, while the form is illustrated in which the cleaning fluid supply portion 10 includes the piston 12 which is adapted to enter and exit from the cylinder 11 and the position of the nozzle 20 is shifted between when in use and when not in use, the cleaning fluid supply portion may take a form in which the piston is not allowed to enter and exit from the cylinder.

In addition, in the embodiment that has been described heretofore, while the single nozzle is described as being supported on the single nozzle holder, two or more nozzles may be supported on the single nozzle holder.

Figure 6:
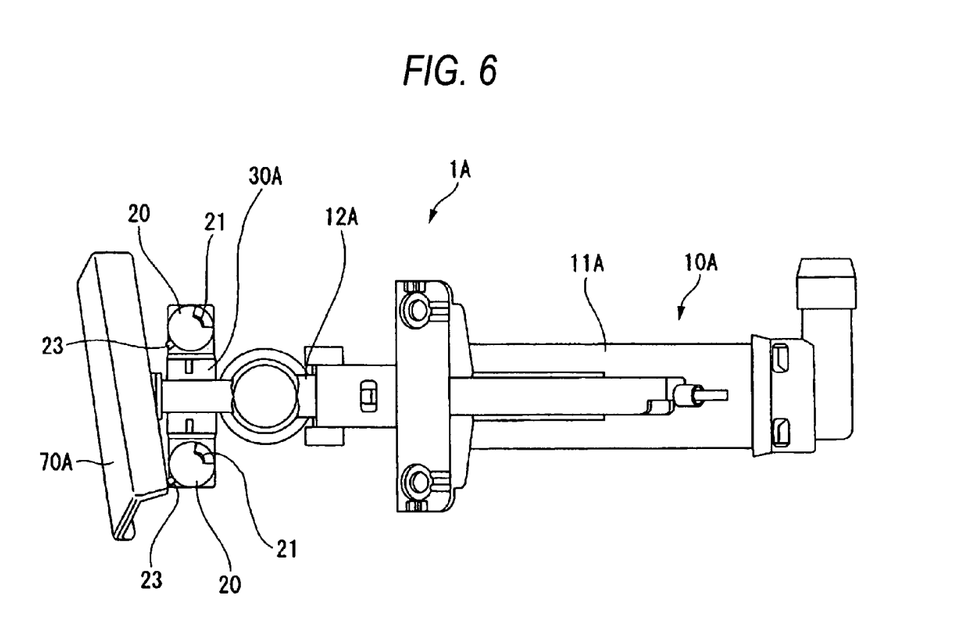
FIG. 6 is a schematic plan view showing another embodiment.

FIG. 6 illustrates another embodiment in which two nozzles are supported on a single nozzle holder.

In this vehicle lamp cleaning apparatus 1A, two nozzles 20, 20 are supported on a nozzle holder 30 supported, in turn, on a distal end portion of a piston 12A which is adapted to freely enter and exit from a cylinder 11A of a cleaning fluid supply portion 10A (FIG. 6 shows a state resulting when not in use, in which the piston 12A is withdrawn into the interior of the cylinder 11A). Then, as to the constructions of connecting portions between the piston 12A and the nozzle holder 30A and between the nozzle holder 30A and the nozzles 20, 20, the relevant connections therebetween are implemented by a second fit portion 60 and a first fit portion 50, respectively, which have the same constructions as those of the aforesaid embodiment shown in FIGS. 1 to 5. In addition, a nozzle cover 70 is attached to a distal end portion of the nozzle holder 30A in such a manner as to cover an area between the headlamp and the vehicle body so as to make the nozzles 20, 20 invisible from the front when not in use.

Thus, as has been described heretofore, according to the present invention, since the height of the nozzle portion can be reduced, the cleaning apparatus can be placed without preparing a large space between the headlamp and the vehicle body.

Note that the shapes and constructions of the respective portions illustrated in the embodiments are only those among examples which can embody the present invention, and it should not be understood that the technical scope of the present invention is construed as being limited by the examples that have been described in the embodiments.

The cleaning unit can be placed without allowing a large space between the headlamp and the vehicle body for placement thereof.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle lamp cleaning apparatus, comprising:
   a cylindrical nozzle having:
      a cleaning fluid injection port at one end; and
      an opened end at the other end thereof;
   a nozzle holder having:
      a flow path which communicates with the cleaning fluid injection port of the nozzle; and
      a first cylindrical joint portion which fits on the other end portion of the nozzle; and
   a cleaning fluid supply portion to which the nozzle holder is connected, wherein
   a first and second annular portions are formed on an inner circumferential surface of the other end portion of the nozzle and an outer circumferential surface of the first joint portion of the nozzle holder, respectively, so as to extend around the full circumference thereof,
   when the other end portion of the nozzle fits on the first joint portion of the nozzle holder, the first and second annular portions fit on and in each other in concavo-convex fitting manner to thereby form a first fit portion, and the nozzle is held by the first fit portion rotatably relative to the nozzle holder only around a first axis which extends in a fitting direction.

2. The vehicle lamp cleaning apparatus as set forth in claim 1, wherein
the nozzle holder further has a second cylindrical joint portion of the nozzle holder situated opposite to the first joint portion across the flow path,
the cleaning fluid supply portion has a cylindrical connecting portion,
a third and fourth annular portions are formed on the second cylindrical joint portion and the cylindrical connecting portion, respectively, so as to extend around the full circumference thereof,
when the second joint portion fit on and in each other, the third and fourth annular portions fit on and in each other in concavo-convex fitting manner to thereby form a second fit portion, and
the nozzle holder is held by the second fit portion rotatably relative to the cleaning fluid supply portion only around a second axis which intersects with the first axis.

3. The vehicle lamp cleaning apparatus as set forth in claim 1, wherein
convex portions of the annular portions which fit on and in each other each have:
an inclined surface which is inclined relative to the fitting direction; and
a locking surface which has a perpendicular or larger angle relative to a fitting-releasing direction,
concave portions thereof each have an inclined surface and a locking surface which correspond to the inclined surface and the locking surface of the convex portions, respectively, and
the convex and concave portions fit in and on each other at least at the inclined surfaces thereof in a face-to-face contact fashion.

4. The vehicle lamp cleaning apparatus as set forth in claim 1, wherein the nozzle holder has a straightening collar portion.

5. The vehicle lamp cleaning apparatus as set forth in claim 1, wherein the nozzle is made of synthetic resin having elasticity.

6. The vehicle lamp cleaning apparatus as set forth in claim 1, wherein the nozzle holder holds plurality of the nozzle.

7. The vehicle lamp cleaning apparatus as set forth in claim 1, wherein the nozzle has a rib at a position which is closer to the upper end of thereof and opposite to the cleaning fluid injection port.

8. The vehicle lamp cleaning apparatus as set forth in claim 1, a number of projections, which are outwardly protrude and vertically extend, are formed on an outer circumferential surface of the nozzle.

9. The vehicle lamp cleaning apparatus as set forth in claim 1, wherein the cleaning fluid injection port opens upwardly relative to a plane which is perpendicular to the first axis.

10. The vehicle lamp cleaning apparatus as set forth in claim 1, wherein the fitting direction is defined by line connecting two members to be fitted.

11. The vehicle lamp cleaning apparatus as set forth in claim 3, wherein the fitting-releasing direction is defined by plane which is perpendicular to the line connecting the two members to be fitted.

* * * * *